US010175774B1

(12) United States Patent
Simjour et al.

(10) Patent No.: US 10,175,774 B1
(45) Date of Patent: Jan. 8, 2019

(54) KEYBOARD HAVING A SPACEBAR WITH TOUCHPAD

(71) Applicant: Google Inc., Mountain View, CA (US)

(72) Inventors: Amirhossein Simjour, Kitchener (CA); Andrew De Los Reyes, Belmont, CA (US)

(73) Assignee: GOOGLE LLC, Mountain View, CA (US)

( * ) Notice: Subject to any disclaimer, the term of this patent is extended or adjusted under 35 U.S.C. 154(b) by 185 days.

(21) Appl. No.: 15/049,929

(22) Filed: Feb. 22, 2016

Related U.S. Application Data

(60) Provisional application No. 62/120,333, filed on Feb. 24, 2015.

(51) Int. Cl.
| | |
|---|---|
| *G06F 3/02* | (2006.01) |
| *G06F 3/0354* | (2013.01) |
| *G06F 3/0488* | (2013.01) |
| *G06F 3/0484* | (2013.01) |
| *G06F 3/0485* | (2013.01) |

(52) U.S. Cl.
CPC ........ *G06F 3/0213* (2013.01); *G06F 3/03547* (2013.01); *G06F 3/0485* (2013.01); *G06F 3/04842* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 8,754,854 B1 | 6/2014 | Hamburgen et al. | |
| 8,803,807 B2 | 8/2014 | Abrams et al. | |
| 8,904,309 B1 * | 12/2014 | Zhai | G06F 3/0482 715/773 |
| 9,019,207 B1 | 4/2015 | Hamburgen et al. | |
| 9,041,652 B2 * | 5/2015 | Elias | G06F 3/044 341/22 |
| 9,092,068 B1 | 7/2015 | Hamburgen et al. | |
| 9,454,239 B2 * | 9/2016 | Elias | G06F 3/0213 |
| 9,529,393 B2 * | 12/2016 | Asbjornsen | G06F 1/1662 |
| 9,703,389 B2 * | 7/2017 | Jiang | G06F 3/0213 |
| 2010/0259482 A1 * | 10/2010 | Ball | G06F 3/0219 345/168 |
| 2012/0242578 A1 | 9/2012 | Laubach | |
| 2012/0256839 A1 | 10/2012 | Suggs et al. | |

OTHER PUBLICATIONS

"Synaptics Brings New Functionality to PCs with SmartBar Technology", retrieved on Jan. 23, 2018 from https://www.synaptics.com/company/news/smartbar-technology, Jun. 3, 2015, 4 pages.

* cited by examiner

*Primary Examiner* — Bryan Earles
(74) *Attorney, Agent, or Firm* — Brake Hughes Bellermann LLP

(57) ABSTRACT

A computer-implemented method includes detecting a pressing of a spacebar on a keyboard and in response to detecting the pressing of the spacebar on the keyboard, determining whether to report the pressing as a space key event or a mouse event.

19 Claims, 6 Drawing Sheets

KEYBOARD HAVING A SPACEBAR WITH TOUCHPAD

CROSS REFERENCE TO RELATED APPLICATION

This application claims the benefit of U.S. Provisional Application Ser. No. 62/120,333, filed Feb. 24, 2015, titled "Keyboard Having A Spacebar With Touchpad," which is incorporated by reference in its entirety.

TECHNICAL FIELD

This description relates to a keyboard having a spacebar that functions as both a spacebar and a touchpad.

BACKGROUND

On computing devices without a touchpad, functions such as text editing may be challenging for users. Even computing devices with touch screens may make functions such as text editing challenging for users because working with the touch screen during text editing may not be accurate and may require the user to move their hands back and forth from the keyboard to the touch screen, which may be inefficient and uncomfortable.

SUMMARY

In one general aspect, a computer-implemented method includes detecting a pressing of a spacebar on a keyboard and in response to detecting the pressing of the spacebar on the keyboard, determining whether to report the pressing as a space key event or a mouse event.

In another general aspect, a computer-implemented method includes detecting a pressing of a spacebar on a keyboard, determining if the spacebar on the keyboard is active as a trackpad, in response to determining that the spacebar on the keyboard is not active as the trackpad, reporting the pressing as a space key event and in response to determining that the spacebar on the keyboard is active as the trackpad, further determining whether to report the pressing as a space key event or a mouse event.

In another general aspect, a computer-implemented method includes detecting a single finger gesture on a spacebar of a keyboard and in response to detecting the single finger gesture on the spacebar of the keyboard, reporting an arrow key event.

In another general aspect, a computer-implemented method includes detecting a single finger gesture on a spacebar of a keyboard and in response to detecting the single finger gesture on the spacebar of the keyboard, reporting a text selection event if the spacebar is pressed down.

In another general aspect, a computing device includes a memory that is configured to store instructions, a processor that is operably connected to the memory and that is configured to execute the instructions stored in the memory, a gesture library that is configured to report events to the processor and a keyboard having a spacebar that is configured to perform as both a spacebar and a trackpad. In response to detecting the pressing of the spacebar on the keyboard, the gesture library is configured to determine whether to report the pressing as a space key event or a mouse event.

Implementations may include one or more of the following features. For example, in response to detecting a single finger gesture on the spacebar of the keyboard, the gesture library is configured to report an arrow key event. In response to detecting a single finger gesture on the spacebar of the keyboard, the gesture library is configured to report a text selection event if the spacebar is pressed down.

The details of one or more implementations are set forth in the accompanying drawings and the description below. Other features will be apparent from the description and drawings, and from the claims.

DETAILED DESCRIPTION

This document describes systems and techniques for a keyboard having a spacebar key (or simply spacebar) that functions as both as a spacebar key and a touchpad. The keyboard may be integrated as part of a computing device such as a laptop or netbook type computing device or the keyboard may be a stand-alone component that connects to a computing device such as a tablet or smart phone. In the different implementations, the computing device or the stand-alone keyboard may not include a touchpad. The spacebar may be configured to function like a trackpad that emulates touchpad cursor and mouse functions and touchpad gestures. Also, the spacebar may be configured to aid text selection and/or text input in an application running on a computing device.

Figure 1A:
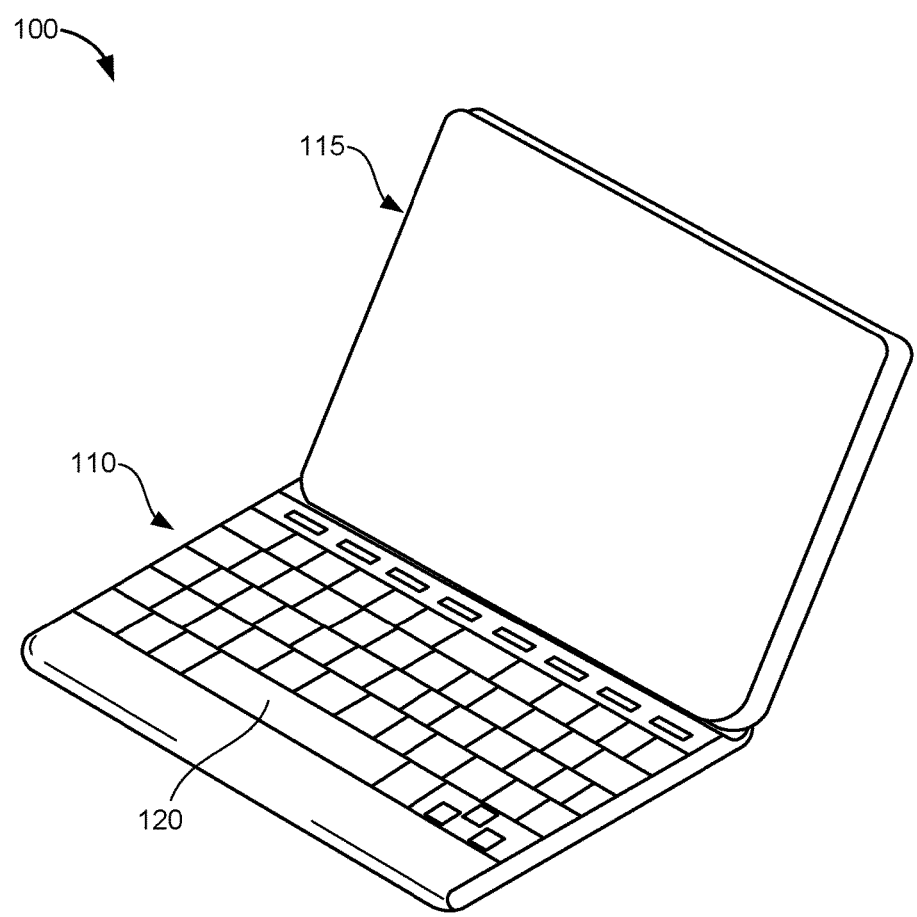
FIG. 1A is an example schematic of a computing device having a keyboard with a spacebar that functions as both a spacebar and a trackpad.

FIG. 1A illustrates an example schematic of a computing device 100. The computing device 100 includes a keyboard 110 and a display 115, where the keyboard 110 includes a spacebar 120. The computing device 100 may include a laptop or netbook type computing device, where the keyboard 110 is in a base of the device. The base of the computing device 100 does not include a touchpad. The display 115 may include a touch screen display such that the objects on the touch screen may be selected to cause the computing device 100 to perform various different actions.

The spacebar 120 may include hardware that enables the spacebar to function as both a trackpad and a spacebar key. The spacebar 120 may include mechanical features that enable the spacebar to function like a key on the keyboard 110 so that when the spacebar 120 is pressed, a space is entered when editing or entering text using an application. The mechanical features may include springs, levers, key activation sensors and other components to enable the spacebar 120 to function like a key on the keyboard 110.

The spacebar 120 also may include hardware that enables the spacebar to function as a trackpad. The spacebar 120 may include a touch sensitive surface having capacitive and/or resistive sensors that enable the spacebar 120 to detect a touch on or near its surface by an object such as a finger, pen, stylus or other object. The spacebar 120 may be configured to detect a touch on or near its surface by more than one object. The touch sensitive surface may be configured to detect movement on or near the surface of the spacebar 120 by one or more objects.

Figure 1B:
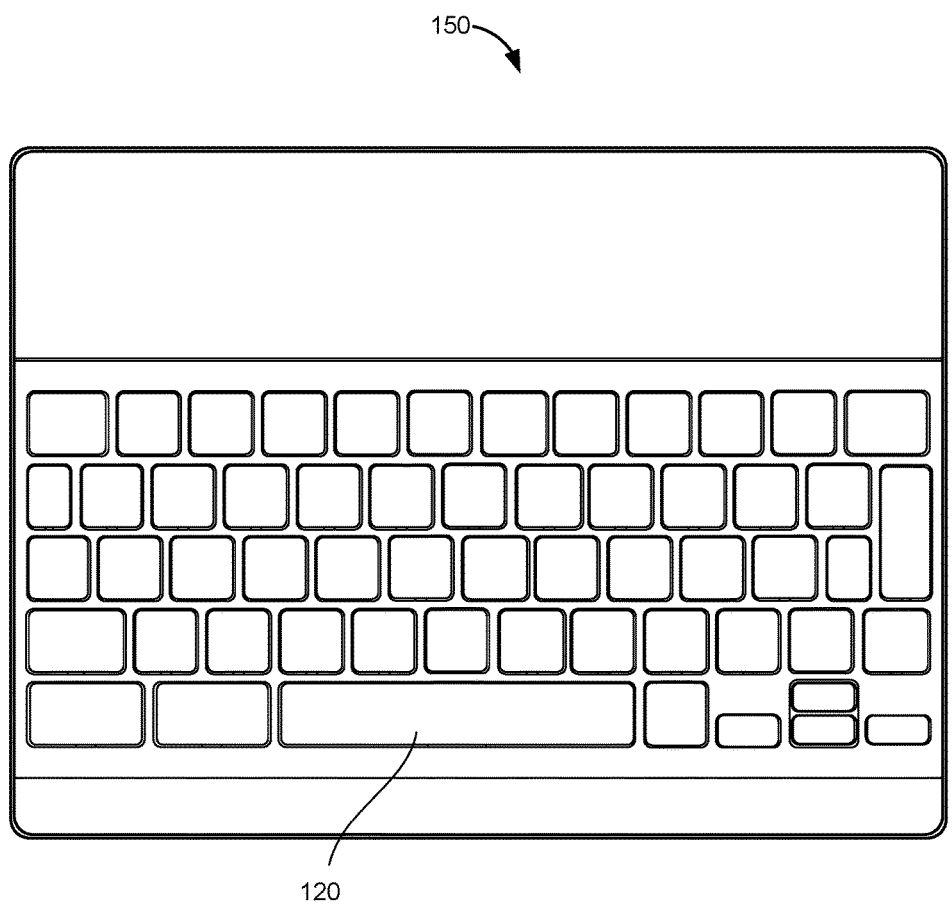
FIG. 1B is an example schematic of a keyboard with a spacebar that functions as both a spacebar and a trackpad.

FIG. 1B illustrates an example schematic of a keyboard 150 that is a separate component and/or a detachable component from a computing device. The keyboard 150 may be a same or similar keyboard as the keyboard 110 of FIG. 1A. The keyboard 150 may communicate using a wired and/or a wireless connection with a computing device such as a tablet, smart phone, a desktop computing device or other computing device, where the computing device may include a touch screen display.

The keyboard 150 includes a spacebar key 120, which is configured to function and operate like the spacebar 120 of FIG. 1A. In this example, the keyboard 150 does not include a touchpad.

Figure 2:
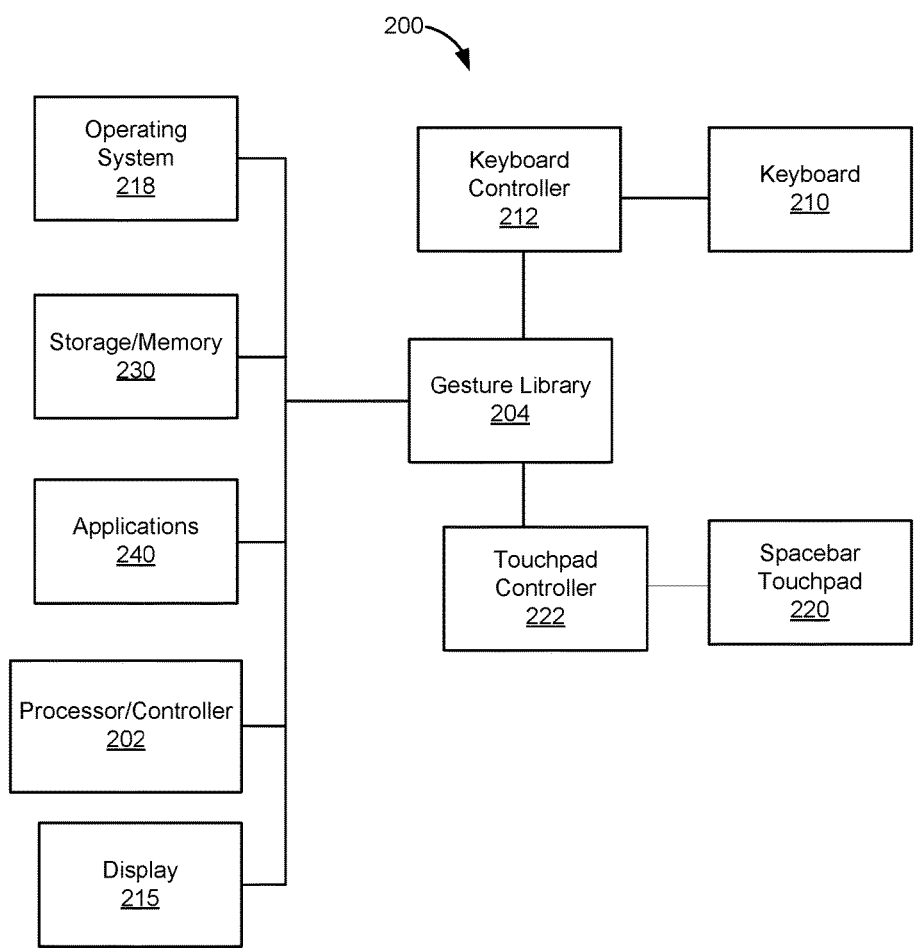
FIG. 2 is an example block diagram of the computing device of FIG. 1A.

FIG. 2 illustrates an example block diagram of the components that may be used in computing device 200. The computing device 200 may be a same (or similar) computing device as computing device 100 of FIG. 1A. One or more of the components illustrated in the computing device 200 in FIG. 2 also may be used with the stand-alone keyboard 150 of FIG. 1B that is connected to a computing device.

Computing device 200 includes the keyboard 210 and the spacebar touchpad 220. The keyboard 210 may be the same as the keyboard 110 of FIG. 1A or the keyboard 150 of FIG. 1B. The keyboard 210 includes the spacebar 120 of FIGS. 1A and 1B. The spacebar touchpad 220 includes the spacebar 120 of FIGS. 1A and 1B in its function as a touchpad. The keyboard 210 includes the spacebar key and its functioning as a traditional spacebar. The spacebar touchpad 220 refers to the same spacebar in the keyboard 210, but it is illustrated as a separate component because of its functioning also as a touchpad.

The computing device 200 includes a keyboard controller 212 and a touchpad controller 222. In other example implementations, a single controller may be used for both the keyboard controller and the touchpad controller. The keyboard controller 212 may be a central processing unit, which may be implemented as an integrated circuit, that functions to interface the keyboard 210 with other components of the computing device such as the gesture library 204. The touchpad controller 222 may be a central processing using, which may be implemented as an integrated circuit, that functions to interface the spacebar touchpad 220 with other components of the computing device such as the gesture library 204.

The computing device 200 includes the gesture library 204, a processor/controller 202, a display 215, which may correspond to the display 115 of FIG. 1A, an operating system (O/S) 218, storage/memory 230 and applications 240.

The gesture library 204 may include one or more software drivers for controlling the functioning or operation of the spacebar as both a traditional key on the keyboard 210 and as a touchpad 220. The gesture library 204 may receive inputs from the keyboard controller 212 and the touchpad controller 222. The gesture library 204 may then process and determine how to report the inputs from the keyboard controller 212 and the touchpad controller 222 to the other components of the computing device 200, including the processor/controller 202, the O/S 218 and/or the applications 240.

In one example implementation, the spacebar 120 may be used as a shortcut key including using touchpad gestures on the spacebar 120 as a shortcut. For example, a gesture recognized by the gesture library may be used to launch an application. Other gestures, for example, pressing a particular spot or three finger gestures, may be used to signal some applications to perform a particular function. For instance, in a music application, a special gesture on the spacebar may be used to play and pause music. In other applications, a special gesture on the spacebar may be used to minimize and maximize a window or move back and forward during a presentation.

Additionally, the spacebar 120 may be configured to operate as a left and right click such as a left mouse click and a right mouse click. For instance, the spacebar may be used for the left click event. The right click event may be performed using two fingers on the spacebar or it may be performed with pressing the spacebar on one of the corners (e.g., the top right corner) as may be defined in a settings file.

The spacebar 120 also may be used for a scrolling gesture. During a scrolling gesture, the user may be allowed to press the spacebar and the space key event may be ignored.

Figure 3:
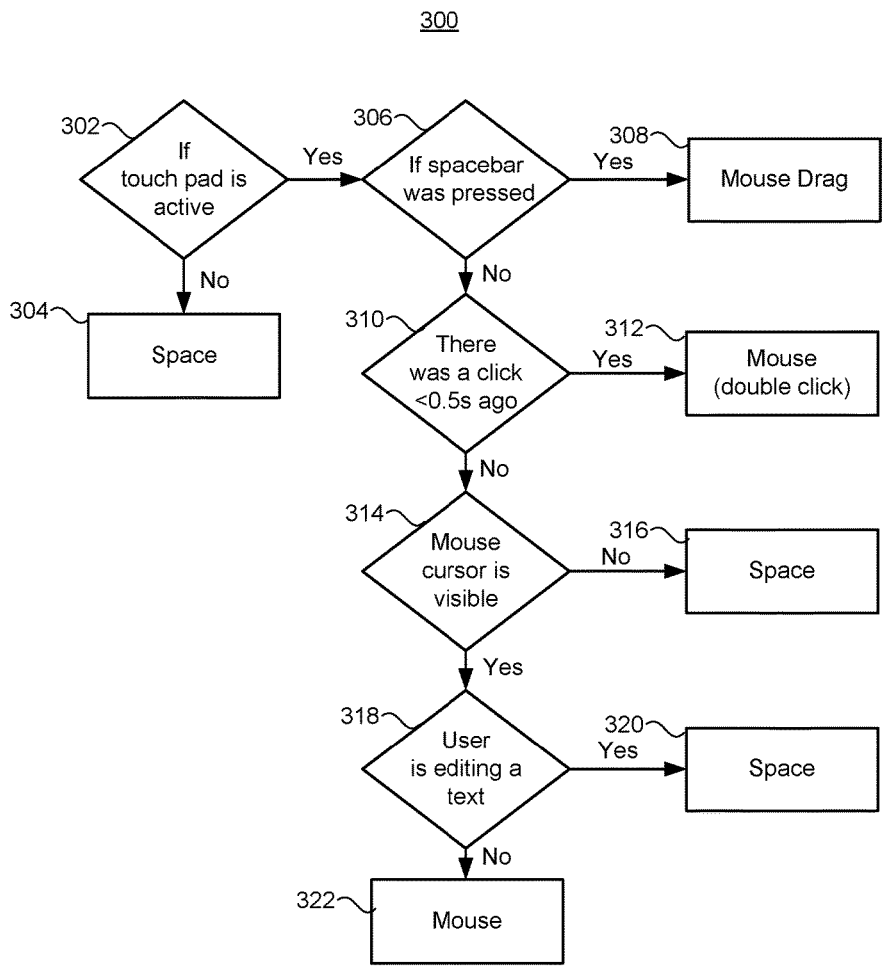
FIG. 3 is an example flow diagram of a process using the keyboards of FIGS. 1A and 1B.

Referring to FIG. 3, an example flowchart illustrates an example process 300. Process 300 may be implemented as at least a portion of a software driver in the gesture library 204. In other implementations, the process 300 may be implemented in other components of the computing device 200.

Process 300 may provide the decision process to enable the spacebar to function as both a space key and a trackpad, where the trackpad includes the functionality of emulating a mouse. Process 300 determines when the input to the spacebar should function as a space input or functions as a trackpad, including mouse functions. Process 300 determines when the user presses the spacebar whether the user intended to enter a space or to click the trackpad and perform a mouse click type function.

Process 300 first determines if the touchpad (or trackpad) is active (302). The touchpad may be active if an object is detected on or near a surface of the spacebar and the object moves more than a threshold distance. If the movement is shorter than the threshold distance, then the trackpad will not be active. In one example, the threshold distance for an object to move is at least 2 mm. In other examples, the threshold distance may be a different value.

If the touchpad is determined not to be active, then pressing the spacebar results in a space being reported to the other components of the computing device (304). For example, if the trackpad is not active because there is no movement by an object on the spacebar or the movement is less than the threshold distance, then a pressing of the spacebar results in the gesture library 204 reporting a space to the other components of the computing device.

If the touchpad is determined to be active, then the gesture library may determine the type of gesture to report to the other components of the computing device based on a number of objects detected on the spacebar and the movement of those objects on the spacebar. The movement of an object on the spacebar switches the movement inputs on the spacebar into mouse-move mode. The movement of the object on the spacebar that is greater than the threshold distance may include a particular gesture such as a vertical or horizontal swipe, two finger gestures or other multiple finger gestures. In one implementation, the keyboard may include a pre-designated additional key on the keyboard to place the spacebar in an active touchpad mode.

Then, movements by the object on the spacebar cause the mouse cursor to move on a display, such as the display 115 of FIG. 1A. Horizontal, vertical and diagonal movements on the spacebar, without pressing the spacebar down, cause the mouse cursor to move in the corresponding direction on the display. The spacebar may control the mouse cursor with the movement of the object or finger on the spacebar. The acceleration of the mouse cursor on the display may function in a manner based on a detected or calculated speed of the movement on the spacebar. The vertical and horizontal sensitivities for movement of the mouse cursor may differ from the sensitivities associated with a regular trackpad due to the limited vertical distance on the spacebar. For example, on the spacebar, the vertical movement may be more sensitive than vertical movement on a traditional trackpad.

Other movements on the spacebar if the touchpad is active may be translated by the gesture library and processed as different types of gestures. For example, horizontal and vertical swipes, two finger gestures, three finger gestures and other multiple finger gestures may be interpreted by the gesture library and communicated to one of the other components in the computing device.

Process 300 continues and determines a type of action to report when the spacebar is pressed. If the touchpad is active, process 300 next determines if the spacebar was already pressed before being active (306). If the spacebar key was pressed prior to the touchpad being active, then the movement on the spacebar is reported as a mouse drag (308). In this manner, the user may first press and hold the spacebar. Then, movement of a finger on the spacebar activates the trackpad on the spacebar. The movement while the spacebar is being held is reported as a mouse drag event.

If the spacebar was not pressed before the touchpad was active, then process 300 determines if there was a click on the spacebar in a text field within a threshold period of time (310). If there was a click, then a pressing of the spacebar is reported as a mouse click event (312), such as a double click. In one example, the threshold period of time may be 0.5 seconds. Other threshold periods of time may be used.

If there was no click within the threshold period of time, then process 300 determines if the mouse cursor is visible (314). If the mouse cursor is not visible, then the pressing of the spacebar is reported as a space (316). For example, in some operating systems or applications, when a user is entering text, the mouse cursor may be hidden. The cursor may be hidden after each click on editable text or after a short time interval after the last gesture. When a user is typing, the cursor may not be visible. Thus, process 300 uses this feature of the mouse cursor being hidden to determine that the user is entering text and the intent of the spacebar press would be to enter a space (316).

If the mouse cursor is visible, then process 300 determines whether the user is editing text (318). If the user is editing text, then the pressing of the spacebar is reported as a space (320). If the user is not editing text, then the pressing of the spacebar is reported as a mouse click event (322).

In this manner, process 300 determines how to treat a pressing of the spacebar. As illustrated, pressing the spacebar can be translated as a click if one of the following conditions satisfies: the pressing event is shortly after a gesture on the spacebar as a touchpad, the pressing event is not shortly after a gesture but the user has not selected any editable object (322), another click happened just before this pressing event (double or triple clicks) (312), after the space and before the release another gesture is started (308) (e.g., potential drag and drop), or pressing the spacebar with more than one finger.

Figure 4:
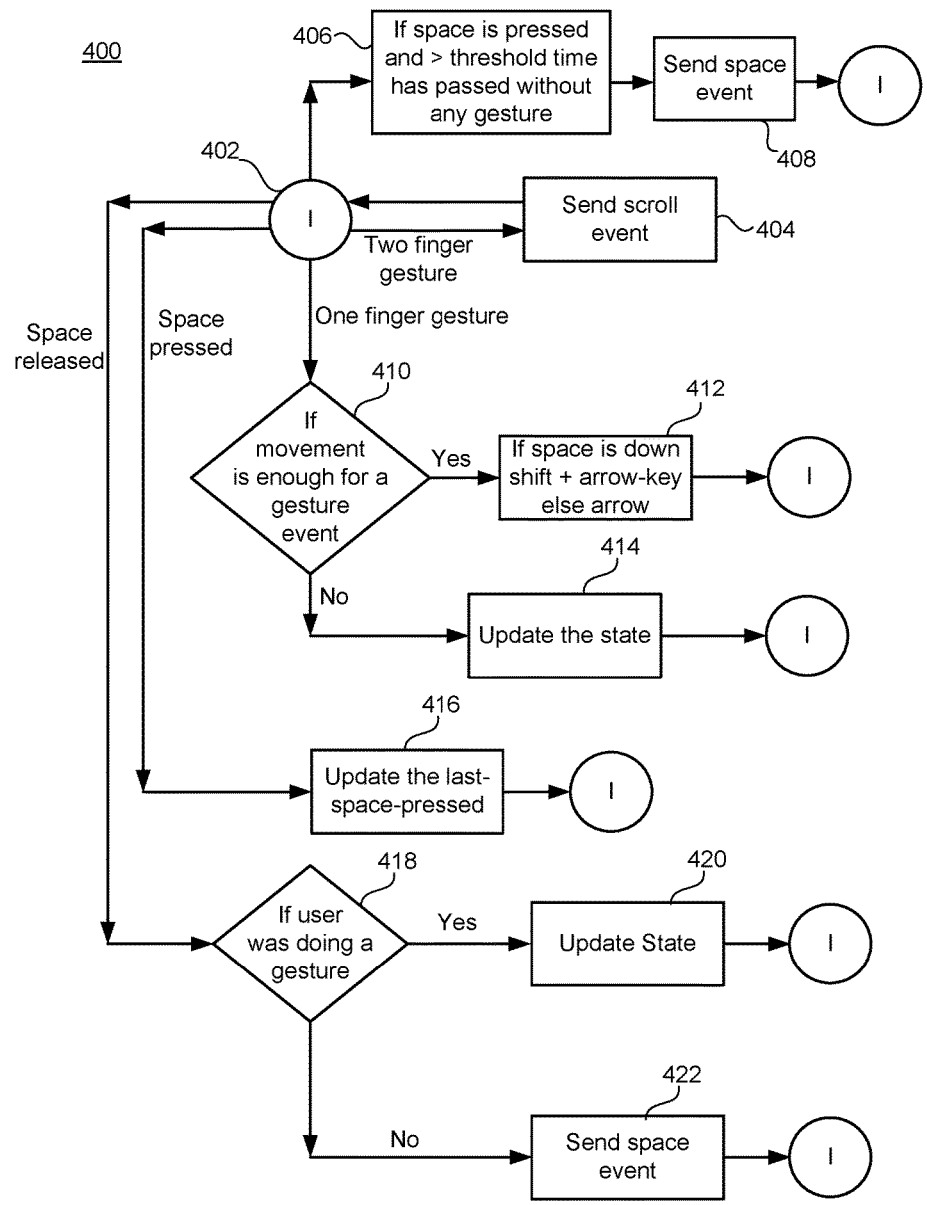
FIG. 4 is an example flow diagram of a process using the keyboards of FIGS. 1A and 1B.

Referring to FIG. 4, an example flowchart illustrates a process 400 for processing movements on a spacebar that functions as both a spacebar and a trackpad. In the example of FIG. 4, process 400 may be implemented in a computing device that uses a touch screen display and does not include a mouse cursor (or arrow cursor). Thus, no arrow cursor would be displayed to a user. If there is no mouse cursor, then a traditional one finger movement on a touchpad is not needed to move the mouse cursor, so this gesture may be implemented in a different manner, as captured in process 400. Instead, when a text caret is present on the display (e.g., a blinking vertical line), a single slide along the spacebar moves the text caret in the direction of the sliding finger. In one implementation, a slide of a single finger on the spacebar reports an arrow key event. For example, a slide of a finger to the right on the spacebar, reports a right arrow key event and moves the text caret to the right. A slide of a finger to the left on the spacebar, reports a left arrow key event and moves the text caret to the left. Similarly, a slide of a finger up on the spacebar reports an up arrow key event and a slide of a finger down on the spacebar reports a down arrow key event.

Like process 300 of FIG. 3, process 400 may be implemented in the gesture library 204 of FIG. 2. Process 400 includes starting at an initial state 402, where the spacebar is waiting for an event to occur. The initial state 402 is represented by a circle I and after an event occurs, the process may return to the initial state 402.

If there is a two finger gesture on the spacebar, then a scroll event is sent by the gesture library to the other components of the computing device (404). After the scroll event (404), the spacebar returns to the initial state (402).

If the spacebar is pressed and more than a threshold period of time passes without any gesture (406), then a space event is reported (408). After the space event (408), the spacebar returns to the initial state (402). In one example, the threshold period of time may be set at 0.5 seconds. Other threshold periods of time may be used.

For a one finger gesture on the spacebar, the following events are processed. Process 400 first determines if the one finger gesture includes movement greater than a threshold for a gesture event (410). In one example, the threshold distance may be 0.2 mm. Other distances may be used for the threshold distance.

If there is enough movement for a gesture event, then if the spacebar key is also pressed, a shift+arrow key is reported, else an arrow key is reported (412). For example, if the user slides a single finger on the spacebar and the spacebar is also pressed, then the gesture library reports a shift+arrow key to the other components of the computing device in the direction of the finger movement, where the shift+arrow key is used to select text. If the user slides a single finger on the spacebar and the spacebar is not pressed, then the gesture library reports an arrow key to the other components of the computing device in the direction of the finger movement, where the arrow key is used to move the text caret. Following the event reporting, the spacebar returns to the initial state (402).

Alternatively, instead of reporting a shift+arrow key to select text or reporting the arrow key to move the text caret, the gesture library may report distances (in pixels) to select or move, and the application would select/move the text caret that distance.

If there is not enough movement for a single finger gesture, then the state of the spacebar is updated (414) and then returned to the initial state (402).

For spacebar events where the spacebar is pressed from the initial state, then the gesture library first updates the last-space-pressed (416) and returns to the initial state (402). Then, when the spacebar is released by the user, the process determines how to treat the release of the spacebar by determining whether the user was performing a gesture (418). If the user was performing a gesture on the spacebar, then the state is updated when the spacebar is released (420) and then returned to the initial state (402). Thus, no space is entered because the user was performing a gesture.

If the user was not performing a gesture, then the gesture library sends a space event (422) to the other components of the computing device and then returns to the initial state (402). In this manner, for the user to enter a space, the process 400 first updates the last-spaced-pressed (416) when the spacebar is pressed, then upon the spacebar release determines whether a gesture was being performed (418) before deciding whether to enter a space event (422). This way, the correct order of space events is maintained when the user is entering text.

Figure 5:
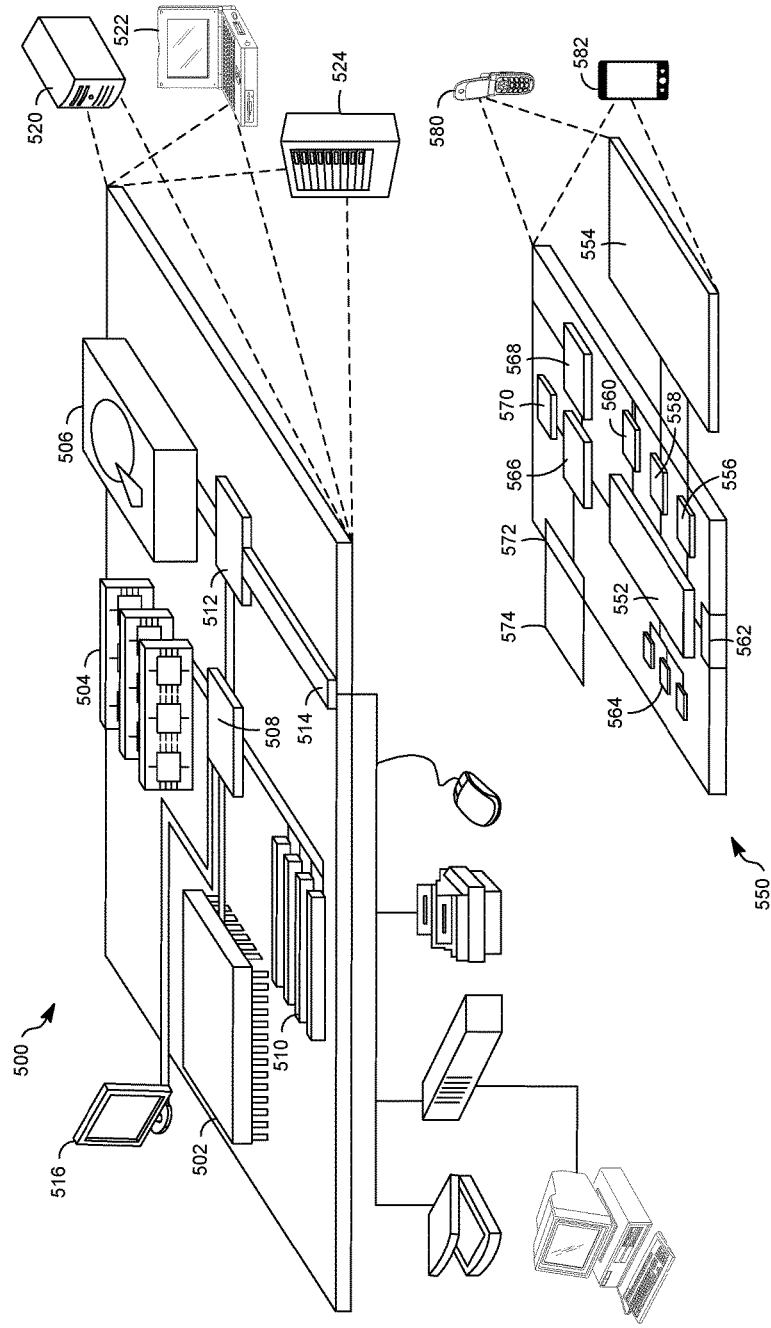
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising executing instructions stored on a non-transitory computer storage device that, when executed, cause a computing device to perform the actions of:

detecting a pressing of a spacebar on a keyboard;

determining if the spacebar on the keyboard is active as a trackpad;
in response to determining that the spacebar on the keyboard is not active as the trackpad, reporting the pressing as a space key event, wherein the space key event includes inserting a space; and
in response to determining that the spacebar on the keyboard is active as the trackpad, further determining whether to report the pressing as a space key event or a mouse event including reporting the pressing as the space key event when a cursor is not visible.

2. The method of claim 1 wherein determining if the spacebar on the keyboard is active as the trackpad comprises:
detecting an object on or near a surface of the spacebar;
detecting if the object moved at least a threshold distance;
in response to the object moved at least the threshold distance, determining that the spacebar on the keyboard is active as the trackpad; and
in response to the object moved less than the threshold distance, determining that the spacebar on the keyboard is not active as the trackpad.

3. The method of claim 1 wherein in response to determining that the spacebar on the keyboard is active as the trackpad, further determining whether to report the pressing as a space key event or a mouse event comprises:
determining if the spacebar was pressed prior to the spacebar being active as the trackpad; and
in response to determining that the spacebar was pressed prior to the spacebar being active as the trackpad, reporting a mouse drag event.

4. The method of claim 3 further comprising:
in response to determining that the spacebar was not pressed prior to the spacebar being active as the trackpad, reporting a mouse click event if there was a click on the spacebar in a text field within a threshold period of time.

5. The method of claim 1 further comprising:
in response to determining that the spacebar on the keyboard is active as the trackpad, detecting a single finger gesture on the spacebar of the keyboard; and
in response to detecting the single finger gesture on the spacebar of the keyboard, reporting an arrow key event.

6. The method of claim 1 further comprising:
in response to determining that the spacebar on the keyboard is active as the trackpad, detecting a single finger gesture on the spacebar of the keyboard; and
in response to detecting the single finger gesture on the spacebar of the keyboard, reporting a text selection event if the spacebar is pressed down.

7. The method of claim 1 wherein the keyboard is integrated as part of the computing device.

8. The method of claim 1 wherein the keyboard is separate and unattached to the computing device.

9. A computer-implemented method comprising executing instructions stored on a non-transitory computer storage device that, when executed, cause a computing device to perform the actions of:
detecting a single finger gesture on a spacebar of a keyboard;
in response to detecting the single finger gesture on the spacebar of the keyboard, reporting an arrow key event if the spacebar is not pressed down;
in response to detecting the single finger gesture on the spacebar of the keyboard, reporting a text selection event if the spacebar is pressed down;
detecting a two finger gesture on the spacebar of the keyboard;
in response to detecting the two finger gesture on the spacebar of the keyboard, reporting a scroll event;
detecting a press of the spacebar of the keyboard; and
in response to detecting the press of the spacebar of the keyboard and a threshold of time has passed without detecting any gesture, reporting a space event.

10. A computing device, comprising:
a memory that is configured to store instructions;
a processor that is operably connected to the memory and that is configured to execute the instructions stored in the memory;
a gesture library that is configured to report events to the processor; and
a keyboard having a spacebar that is configured to perform as both a spacebar and a trackpad, wherein:
the processor is configured to detect a pressing of the spacebar on the keyboard,
the processor and the gesture library are configured to determine if the spacebar is active as the trackpad,
in response to determining that the spacebar on the keyboard is not active as the trackpad, the gesture library is configured to report the pressing as a space key event, wherein the space key event includes inserting a space, and
in response to detecting the spacebar on the keyboard is active as the trackpad, the gesture library is configured to determine whether to report the pressing as a space key event or a mouse event including reporting the pressing as the space key event when a cursor is not visible.

11. The computing device of claim 10 wherein:
in response to determining that the spacebar on the keyboard is active as the trackpad, the gesture library is configured to detect a single finger gesture on the spacebar of the keyboard; and
in response to detecting the single finger gesture on the spacebar of the keyboard, the gesture library is configured to report an arrow key event.

12. The computing device of claim 10 wherein:
in response to determining that the spacebar on the keyboard is active as the trackpad, the gesture library is configured to detect a single finger gesture on the spacebar of the keyboard; and
in response to detecting the single finger gesture on the spacebar of the keyboard, the gesture library is configured to report a text selection event if the spacebar is pressed down.

13. The computing device of claim 10 wherein:
in response to determining that the spacebar on the keyboard is active as the trackpad, the gesture library is configured to detect a two finger gesture on the spacebar of the keyboard; and
in response to detecting the two finger gesture on the spacebar of the keyboard, the gesture library is configured to report a scroll event.

14. The computing device of claim 10 wherein the processor and the gesture library are configured to determine if the spacebar is active as the trackpad by:
detecting an object on or near a surface of the spacebar;
detecting if the object moved at least a threshold distance;
in response to the object moved at least the threshold distance, determining that the spacebar on the keyboard is active as the trackpad; and in response to the object moved less than the threshold distance, determining that the spacebar on the keyboard is not active as the trackpad.

15. The computing device of claim 10 wherein the mouse event includes a right mouse click.

16. The computing device of claim 10 wherein the mouse event includes a left mouse click.

17. The computing device of claim 10 wherein the space key event includes inserting the space at a caret location.

18. The computing device of claim 10 wherein the keyboard is integrated as part of the computing device.

19. The computing device of claim 10 wherein the keyboard is separate and unattached to the computing device.

* * * * *